US007516895B2

(12) United States Patent
Holoubek (10) Patent No.: US 7,516,895 B2
(45) Date of Patent: Apr. 14, 2009

(54) BAR CODE SYNCHRONIZATION PROCESS FOR SCANNING IMAGE CONTAINING DOCUMENTS

(75) Inventor: Michael J. Holoubek, Arnold, MD (US)

(73) Assignee: Annapolis Technologies, LLC, Baltimore, MD (US)

(*) Notice: Subject to any disclaimer, the term of this patent is extended or adjusted under 35 U.S.C. 154(b) by 613 days.

(21) Appl. No.: 11/191,862

(22) Filed: Jul. 28, 2005

(65) Prior Publication Data

US 2005/0273356 A1 Dec. 8, 2005

Related U.S. Application Data

(63) Continuation-in-part of application No. 10/601,983, filed on Jun. 20, 2003, now Pat. No. 7,333,936.

(60) Provisional application No. 60/390,861, filed on Jun. 20, 2002.

(51) Int. Cl.
*G06K 7/10* (2006.01)
(52) U.S. Cl. .............................. 235/462.01; 235/462.25
(58) Field of Classification Search ............ 235/462.01, 235/462.07, 462.09, 380, 382, 462.25
See application file for complete search history.

(56) References Cited

U.S. PATENT DOCUMENTS

| 4,201,617 A | 5/1980 | Orsinger et al. |
| 5,033,725 A | 7/1991 | van Duursen |
| 5,054,620 A | 10/1991 | DeWitt et al. |
| 5,104,681 A | 4/1992 | Sansone |
| 5,188,464 A | 2/1993 | Aaron |
| 5,310,062 A | 5/1994 | Stevens et al. |
| 5,468,945 A | 11/1995 | Huggett et al. |
| 5,493,106 A | 2/1996 | Hunter |
| 5,602,382 A | 2/1997 | Ulvr et al. |
| 5,737,438 A | 4/1998 | Zlotnick et al. |
| 5,810,173 A | 9/1998 | Stevens et al. |
| 5,842,577 A | 12/1998 | Stevens et al. |
| 5,842,693 A | 12/1998 | Stevens et al. |
| 6,141,012 A * | 10/2000 | Bollman et al. ............. 345/418 |
| 6,196,393 B1 | 3/2001 | Kruk, Jr. et al. |
| 6,303,889 B1 | 10/2001 | Hayduchok et al. |
| 6,728,400 B1 * | 4/2004 | Matsugu ..................... 382/164 |
| 6,897,394 B1 | 5/2005 | Dibiaso et al. |
| 2003/0210802 A1 * | 11/2003 | Schuessler .................. 382/100 |
| 2003/0213841 A1 * | 11/2003 | Josephson et al. ........... 235/379 |
| 2004/0135902 A1 * | 7/2004 | Steensma ............... 348/231.99 |

FOREIGN PATENT DOCUMENTS

DE 3124778 A1 1/1983

OTHER PUBLICATIONS

Business Editors & High Tech Writers, NewSoft Announces Prestol Page Manager 98; Gold Edition Powerful Scanning OS Tames the Pater Tiger with Fast Scanning and Accurate OCR, Business Wire, May 11, 1998, p. 1.

* cited by examiner

*Primary Examiner*—Daniel St.Cyr
(74) *Attorney, Agent, or Firm*—Whiteford, Taylor & Preston LLP (57) ABSTRACT

Disclosed is a method and system for enabling the high speed processing of image containing documents (i.e., photographs) to convert the same into electronic documents that may be electronically distributed to the original intended recipient without requiring the recipient to come into contact with the original image containing documents.

28 Claims, 6 Drawing Sheets

BAR CODE SYNCHRONIZATION PROCESS FOR SCANNING IMAGE CONTAINING DOCUMENTS

CROSS-REFERENCE TO RELATED APPLICATIONS

This application claims priority under 35 U.S.C. §120 as a continuation-in-part of the U.S. patent application Ser. No. 10/601,983, filed on Jun. 20, 2003, now U.S. Pat. No. 7,333,936, which claimed priority under 35 U.S.C. §119 from U.S. Provisional Patent Application Ser. No. 60/390,861, filed on Jun. 20, 2002. The U.S. patent application Ser. Nos. 10/601,983 and 60/390,861 are herein incorporated by reference in their entireties.

BACKGROUND OF THE INVENTION

1. Field of the Invention

The invention disclosed herein relates generally to methods and systems for digital mail management and photographic image management, and more particularly to a method and system for enabling the high speed processing of physical mail articles and image containing documents (i.e., photographs) to convert the same into electronic documents that may be electronically distributed to the original intended recipient without requiring the intended recipient to come into contact with the original, physical mail article or image containing document.

2. Description of the Background

Individuals, corporations, government entities, and every other party that receives mail have become increasingly concerned over the threat of contaminated mail. Terrorist events in the United States in 2001 relating to anthrax-laced mail have caused great concern, and at times near panic, over the health threat a person may realize simply by opening a new piece of mail. Since the realization that such a terrorist threat does truly exist, a need has been realized to implement a safeguard that could neutralize the threat of contaminated mail without degrading the general conveniences and limited costs associated with traditional mail delivery.

One avenue to reduce the risk posed by terrorist attempts to contaminate the mail is to prevent distribution of the physical, potentially contaminated mail article to the intended recipient. However, if such recipient is still to receive the information contained in the original mail document(s), a substitute for such physical article must be provided. Such a substitute may take the form of an electronic message including scanned images of the contents of the original, potentially contaminated mail article. In this case, the physical mail article may be delivered to a remote facility employing appropriate safety measures to neutralize the threat of possible contaminants, opened and scanned at such facility, and thereafter delivered digitally to the intended recipient. However, providing a viable digital delivery system, or a method or system for converting a large number of physical mail articles into a form which may be easily and accurately distributed electronically has heretofore not been accomplished.

More particularly, while high speed processing would require high speed scanning equipment that could process mail articles in batches, prior known methods and systems for digitizing mail articles have required the processing of each mail article through smaller, slower scanners because envelopes and their contents cannot be confidently scanned in batch mode. Batch scanning generally requires some consistency with thickness and size of the documents within the batch. Ordinarily, envelopes are thicker but smaller in size than their contents. Likewise, envelopes are generally open at the top end and must be scanned bottom first to prevent misfeeds. Thus, in order to prevent misfeeds, all documents in a batch must have their leading edges on the same line (with the closed envelope edge in the proper orientation) for feeding into a scanner. Unfortunately, it is extremely difficult and time consuming to get the leading edges of a mixed batch of envelopes and contents (i.e., a batch comprised of envelopes and their contents interspersed with one another) to properly align. Therefore, it is more likely to get a scanner jam or double feed or scan out of order in a mixed batch. In a production scanning environment, it would thus be much more efficient to scan envelopes in batches and contents in other batches.

However, scanning envelopes and contents in their own separate batches provides its own difficulties. While address information is at times available on both the contents and the outside of the envelope in which they are shipped, there are often times when address information of the sender is only available on the envelope. Thus, if batches of envelopes and batches of contents are scanned separately, it is necessary that a process for synchronizing the data and images of the separate batches be provided.

It would therefore be advantageous to provide a method and system for scanning mail documents separated into envelope and contents batches, while enabling synchronization of such scanning process to ensure association of all relevant data for each mail article.

It is also well known for individuals, corporations, government entities, and every other party to take, receive, and store various image containing documents, such as photographs, scrolls, parchments, tablets, and the like. Over time and due to various storage and handling techniques many of these image containing (photographic) documents may become degraded and/or deteriorate. This degradation and/or deterioration may affect everything from the quality of the image contained on the document to the document itself becoming fragile and prone to destruction. Such threats to the image containing document and a need to implement a safeguard that could assist in neutralizing these threats of degrading and/or deteriorating image containing documents without eliminating the ability to view such image containing documents exists.

One solution is to digitize the image containing document, thereby allowing the image to be viewed upon an electronic medium without placing the document at risk to exposure and or handling which may result in the degradation and/or deterioration of the document. This may assist in reducing the risk of damage to the document and may further allow for the transmission of the document, in electronic form, to various locations. Thus, the need for physically transporting the actual document is reduced as transmission of a viable reproduction of the image on the image containing document may be sent electronically.

While various systems for digitizing image containing documents (i.e., photographs) are known in the art, a method or system for converting a large number of image containing documents into a form which may be easily and accurately distributed electronically has heretofore not been accomplished. It would therefore be desirable to provide a method and system for scanning individual and large numbers of image containing documents while ensuring the synchronization of the scanning process to ensure association of all relevant data for each image containing document.

SUMMARY OF THE INVENTION

A method and system for enabling the transfer of information within physical mail articles without risking exposure of the intended recipient to hazardous contaminants in the physical mail article are disclosed herein. In a preferred embodiment of such method and system, the physical mail items are preferably scanned in separate batches of envelopes and contents, and the production of electronic documents from the physical originals is preferably managed through the use of multiple bar code sets having the same identifiers for different sets.

In a preferred embodiment of the method and system for scanning mail documents set forth herein, envelopes and their contents are separated into envelope batches and contents batches, and bar code labels are attached to items in each batch. The bar code labels preferably have at least a numerical portion, and the numerical portions of the bar code labels are identical between the two sets, thus enabling correlation between a particular envelope and its contents even after they have been separated from one another. Once the bar code labels are applied, the batches are scanned independently of one another, and the listing of bar codes in each batch are written to a file. Thereafter, the bar code listings for related envelope and contents batches are compared to one another to locate missed bar codes in either batch, in turn prompting further inspection of a precise document in a batch to diagnose the cause of the error. Such batch processing thus enables high speed processing of the physical documents for conversion into electronic form, and automated analyses to quickly and accurately diagnose misread or unscanned pages.

It is an object of the present invention to provide a method and system for an image containing documents (i.e., photographs, scrolls, parchments, canvases, and the like) to be converted into a digital image. The method and system allow for an increase in the speed with which these image containing documents are converted. The method and system further provide a way to assist in avoiding contact between the image containing document and an intended recipient. Further, the method and system allow for the transmission of the image containing document in an electronic format (digital image file) to the intended recipient.

DETAILED DESCRIPTION OF THE PREFERRED EMBODIMENTS

The invention comprises a method and system for enabling the transfer of information within physical mail articles without risking exposure of the intended recipient to hazardous contaminants in the physical mail article.

While traditional bar code labeling methods and systems have provided for the printing and/or production of bar codes having unique numbers such that each bar code may be uniquely distinguished, a preferred embodiment of the method and system of the invention generates two sets of sequentially numbered lists of bar code labels, such that one set may be associated with the envelopes of a batch of mail articles, while the other set may be associated with the contents of the same batch of mail articles. Each of the two sets is preferably provided one or more alpha-numeric characters that associate each label with one of the two sets, and a unique number identifying a particular mail article in each set. For example, one of the two sets may be prefaced with a character string such as E or ENV, signifying a label set to be associated with the envelopes in a single batch, and the other set may be prefaced with a character string such as C or CON, signifying a label set to be associated with the contents of that batch. Of course, any other combination of alpha-numeric characters may also be used in such embodiment of the invention, so long as the character strings distinguish the envelope set from the contents set. Preferably, in an embodiment of the invention in which the bar code labels are applied to the batches by hand, the bar code labels are printed in such fashion that envelope labels and content labels are interspersed on a single sheet. Thus, for example, in a sheet of labels having multiple rows and columns of bar code labels, proceeding down a single column, the bar code labels would be produced such that a first label may, for example, have the prefix ENV followed by a numeral, the second label would have the prefix CON followed by the same numeral, the third label would have the prefix ENV followed by a second numeral (preferably a single numerical iteration away from the first numeral), the fourth label would have the prefix CON followed by the second numeral, and so on throughout the entirety of the labels on the sheet. In this way, a human label applicator may easily follow an organized sequence for labeling batches without having to switch between label sheets, in turn reducing the risk of human error resulting in mislabeled items.

As mentioned above, the other portion of each bar code label includes a number identifying a particular mail article in each of the envelope and content sets. The number portion of the bar code is identical for each set. Thus, for example, in a batch initially comprised of 30 envelopes and their contents (which becomes separated into a stack of 30 envelopes and a separate stack of their associated contents), the two sets of labels may comprise a first set having labels formatted as ENV0001, ENV0002, . . . ENV0030, with the second set having labels formatted as CON0001, CON0002, . . . CON0030.

Figure 1:
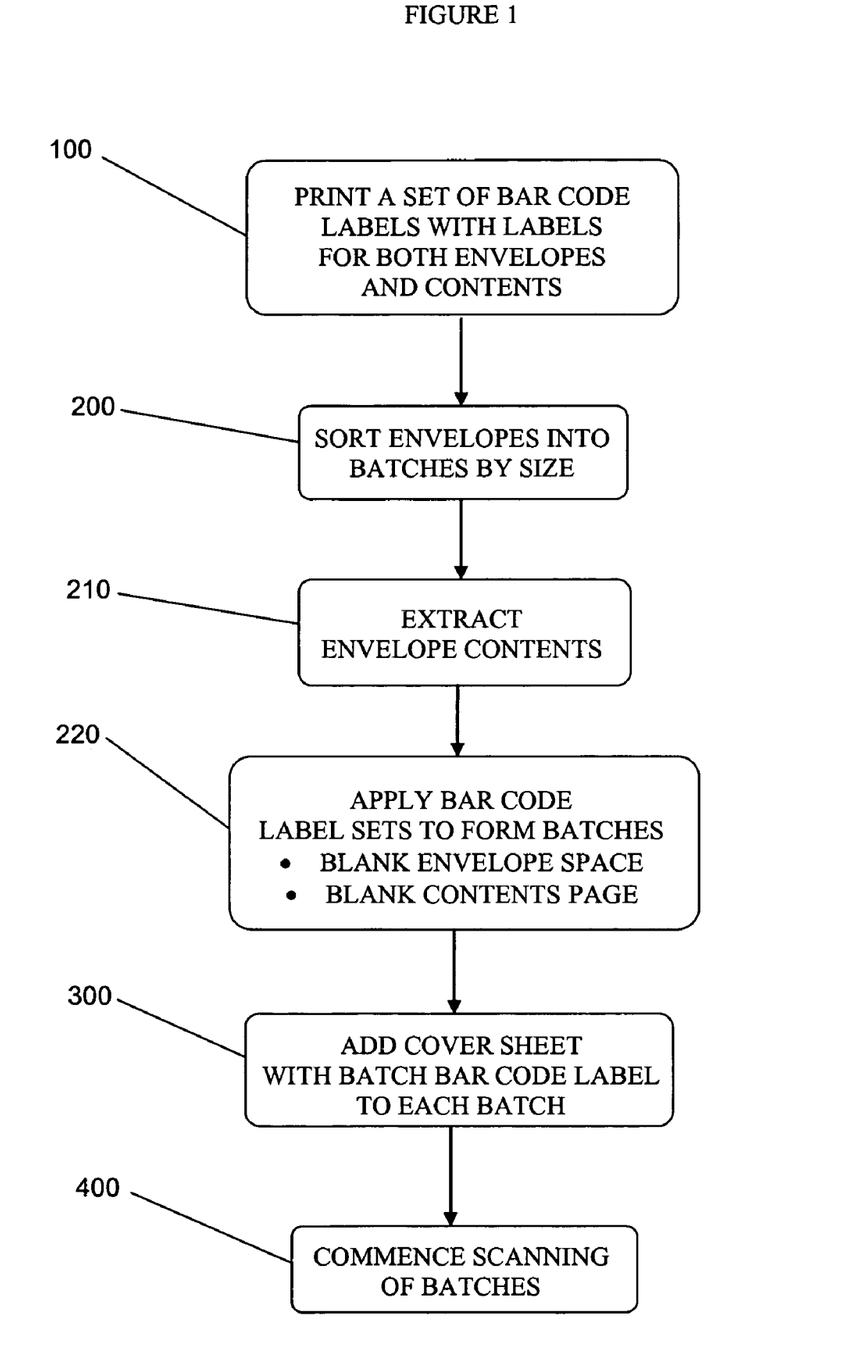
FIG. 1 is a schematic representation of an exemplary method for preparing documents for scanning according to a first aspect of a preferred embodiment of the invention.

As shown in the schematic view of FIG. 1, in addition to preparation of the coordinated sets of bar code labels, at step 100, a preferred embodiment of the invention also requires that the envelopes and contents be physically prepared. At step 200, an initial sort may be provided in which envelopes of like size are collected into groups, and batches (e.g., batches of 30 envelopes with their contents) are pulled from each such group of like-sized envelopes. In this way, each envelope batch will be of uniform size so as to minimize the risk of document feed errors in the scanning equipment. After such sorting of like-sized envelopes and selection of a batch therefrom, the envelopes of the batch are opened and their contents extracted at step 210, thus forming a batch of envelopes and a batch of contents. Bar code labels conforming to the numbering scheme outlined above may then be applied at step 220 as follows.

With both the envelope and contents batches arranged in corresponding order, a label from the label set corresponding to the envelopes is applied preferably to any open space on either the front or back of each consecutive envelope, until the envelope bar code labels for that batch are fully expended. A label from the label set corresponding to the contents is likewise applied to each set of contents. If the first page of the contents is one-sided, and thus has an available blank back side, the label is preferably applied to the blank, back side of the first page. If the first page is two-sided, a blank page is preferably inserted at the front of the contents, and the label is applied to such newly inserted blank page. Thus, each item of contents will preferably have at least one page that is blank bearing a bar code label. As will be explained in greater detail below, the application of the label to a blank page allows for a highly efficient automated sort of scanned content pages to identify only those scanned images that contain bar codes, based simply on the known image file size of a blank page of paper having only a bar code placed thereon. Such a sorting of only those pages bearing bar codes enables a system operator to quickly view a series of bar code labels scanned in a single batch, and likewise promptly identify any bar codes (and associated contents) that are missing or not in appropriate consecutive order in a batch. It should be noted that while for simplicity, the labels can be applied by a human clerical employee, the application of the bar code labels may likewise be achieved through the use of automated labeling equipment which physically applies the labels to the free space of an envelope or a blank page in the contents documents, or may even be printed thereon, without departing from the spirit and scope of the invention. Thus, as used herein, the term "label" is intended not to be limited to an adhesively applied label bearing a barcode, but any alpha-numeric character string or machine-readable data printed or otherwise placed on the envelope or contents page so as to mark that document with an associative identifier linking it to its envelope/contents counterpart.

So as to reduce the risk that corresponding envelope and content bar code labels are misapplied to individual envelopes or content collections that do not in fact correspond with one another, it is advisable that the application of labels be performed pursuant to a continuous process of applying an envelope label first to the open space of the envelope, opening the envelope and extracting the contents, applying the associated contents label to the back side of the first page of the contents (or inserting a blank page having such bar code label), and adding the newly labeled envelope and contents set to their respective batches.

Once a batch of envelopes and corresponding contents has been so labeled, a blank sheet bearing a batch bar code label is preferably placed with each batch at step 300 so as to uniquely identify each batch. The bar code labels applied to associated batches of envelopes and their contents preferably include the same number so as to establish the correlation between the associated envelope and contents batches. Moreover, as with the bar code labels associated with the individual envelopes and their contents, the labels associated with separate batches may include an alpha-numeric character string to identify the batch as either an envelope batch (such as by inclusion of the character string "ENV" or "BENV") or a contents batch (such as by inclusion of the character string "CON" or "BCON"). By associating such a separate batch identifier with each batch, associated batches of envelopes and their contents remain linked by the machine-readable batch identifier, thus enabling the entirely separate processing of envelope and contents batches.

The bar code label applied to such sheet may also be used to provide a signal to the scanning equipment that a new batch is queued for processing. More particularly, the scanning control software may be configured to recognize a particular bar code label as a batch bar code label. Thus, when a new batch bar code label is scanned, the software may automatically create a new database batch file identifiable by the batch bar code, scan the documents (envelopes or contents) that follow, and save the scanned images to the database batch file associated with that batch bar code label, in turn creating an electronic library of scanned images sorted into their respective batches.

Further, it is preferred that the blank sheet to which the batch label is attached be a sheet having a distinct color, such as a pastel color, so as to enable a human operator to readily distinguish separate batches while ensuring that an appropriate resolution is maintained between the graphics on the label and the sheet itself. This ensures that the bar code label remains distinguishable from the paper sheet to which it is applied.

As mentioned above, after the batches have been prepared as above with bar code labels, scanning and automated document processing may proceed at step 400. Each batch, whether envelopes or contents, is scanned using high speed scanning equipment. Separation of the batches into like-sized envelopes and separate contents allows such high speed scanning to proceed with reduced risk of misfeeds.

Figure 2:
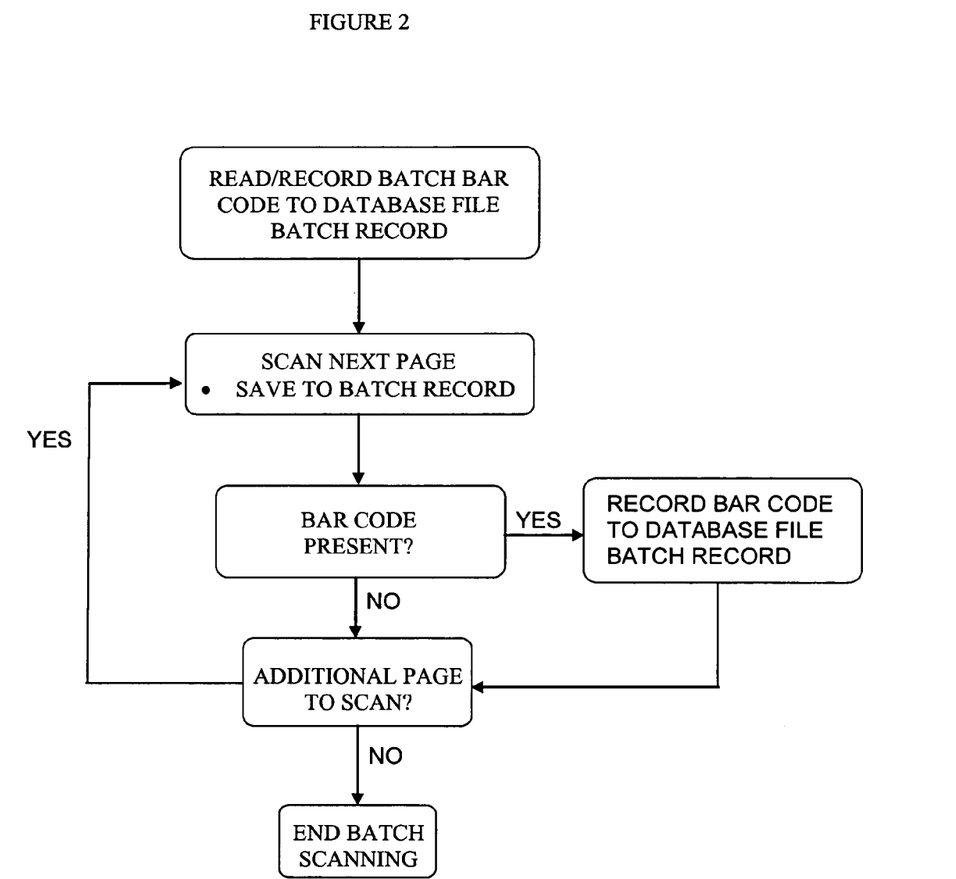
FIG. 2 is a schematic representation of an exemplary method for scanning documents according to another aspect of a preferred embodiment of the invention.

As shown in the schematic view of FIG. 2, each envelope batch is scanned preferably so as to create an electronic image of the front and back of each envelope. The electronic images are preferably stored in memory or on a hard drive that is in communication with, for example, a controlling microprocessor having control logic thereon (preferably in the form of software), which control logic operates and controls the system. Additionally during such scanning process, each envelope bar code label is scanned and a file is written that lists all of the individual envelope bar codes scanned in the batch, as well as the general envelope batch bar code applied to the blank sheet at the start of the batch. Such file is also preferably stored in memory or on a hard drive, and is particularly linked to the electronic images corresponding to such batch. For example, the images and bar code data may be managed by a database software program, with the images, individual envelope bar codes, and general batch bar code together comprising a single "batch record" in the database.

Likewise, each contents batch is scanned so as to create an electronic image of the front and back of each contents page. These electronic images are also preferably stored in memory or on a hard drive as set forth above. Further, each contents bar code label is likewise scanned during the scanning process, and a file is written that lists all of the individual contents bar codes scanned in the batch, as well as the general contents batch bar code applied to the blank sheet at the start of the batch. This file is also stored in memory or on a hard drive, and as with the envelope batches; it is particularly linked to the electronic images corresponding to such batch.

It should be noted that because the contents and envelope batches are entirely separate from one another, and once scanned, are indexed via the batch bar code labels so that corresponding electronic envelopes and contents files may be identified, their physical processing and scanning may be carried out independently of one another.

Once corresponding batches of envelopes and contents have been scanned and the computer files listing all individual bar codes identified in a scanned batch are generated, an automated bar code comparator software program is initiated to confirm at step 500 (FIG. 3) correlation of the elements in related envelope and contents batches. Preferably, initiation of such comparator software program occurs automatically upon saving a completed new batch file to the database, whether such batch comprises envelopes or contents. Upon the completion of a new batch file, the software program thus automatically checks to see if the correlating envelope or contents batch file has yet been created and, if it has, initiates the following comparator process. First, the comparator at step 510 retrieves from a batch record the bar code input from scanning the bar code label attached to the blank sheet at the start of an envelope or contents batch (i.e., the "batch bar code"), and likewise retrieves the list of individual bar code numbers for the elements in that batch that have been scanned. The comparator then at step 520 locates the corresponding envelope or contents batch record by finding the corresponding batch that shares the same batch bar code numeral, but with a differing prefix identifying the batch as either an envelope or contents batch. Once located, the comparator retrieves from the located batch record the list of individual bar code numbers for the elements in that batch.

Figure 3:
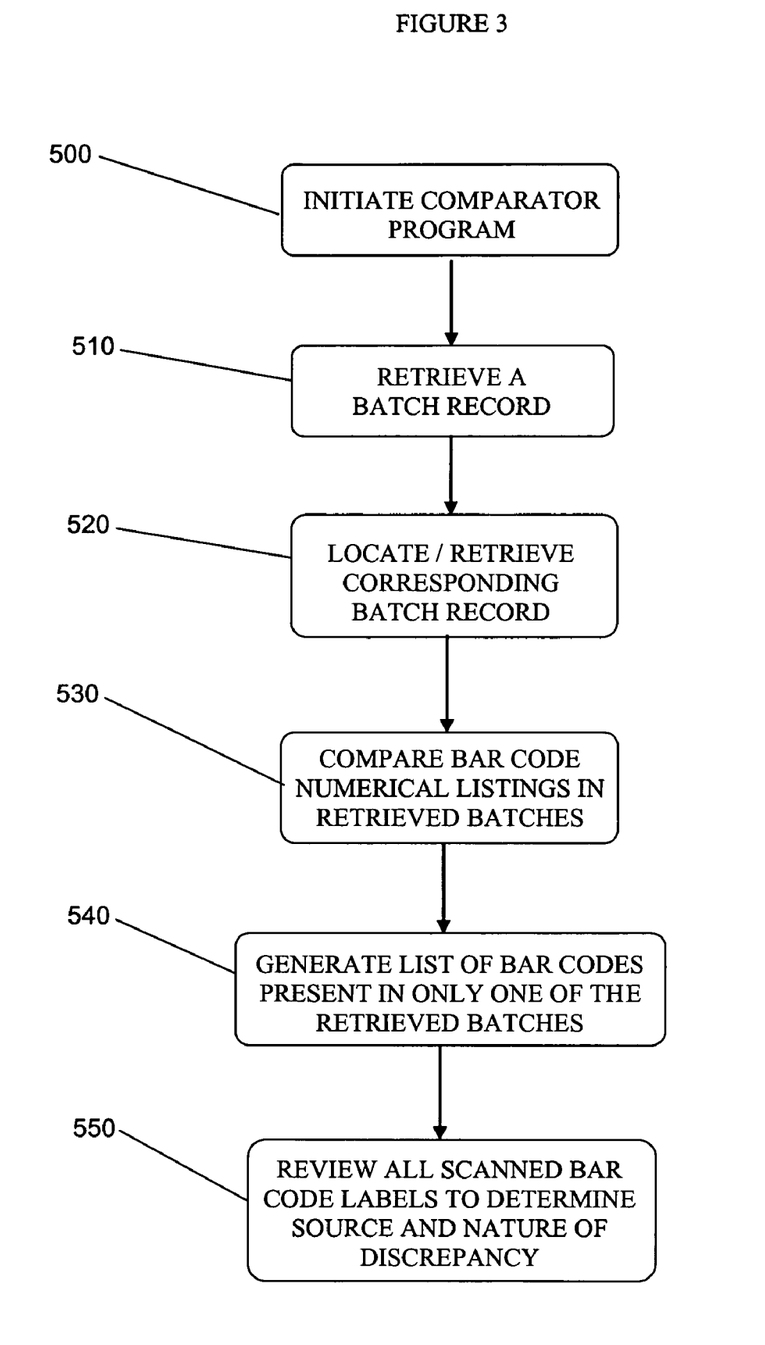
FIG. 3 is a schematic representation of an exemplary method for automatically comparing scanned batches of documents according to yet another aspect of a preferred embodiment of the invention.

Once the individual bar code numbers have been so retrieved, at step 530 the comparator analyzes each list of bar code numbers to determine whether a 1:1 correlation exists between the numerical portions of the bar codes in the two lists. In the event that a 1:1 correlation does exist, further automated processing of the batches in preparation for electronic delivery may proceed, as further set forth below. However, in the event that a 1:1 correlation does not exist, a list is preferably generated at step 540 of any bar code numerals in corresponding envelope and contents batches that are present in only one of those batches. Such presence of a particular bar code numeral in only one of the corresponding batches indicates that the other related batch contains one or more documents which were not properly scanned, and thus requires intervention. When such a "missing" bar code numeral is identified, the system retrieves the images scanned in each of the two related batches, and preferably displays them to a human operator. The human operator may then at step 550 sort the scanned images by file size, and display only those images having a file size corresponding to a blank page having only a bar code placed thereon. By viewing those bar code pages, the user may thus readily visually identify the nature of the problem, such as whether documents were entirely missed during the scanning process, or if a bar code label was simply misapplied such that the system was incapable of properly reading that particular bar code label. After diagnosing the particular problem, the operator may then take whatever corrective action is necessary, such as rescanning pages that were missed in the original scan, or confirming that the error was due to a misapplied or damaged (and thus unread) bar code label, in which case the operator may manually modify the batch record adding the previously unread bar code. Alternately, the operator may simply confirm during their visual review that all documents in each batch were scanned despite an unread bar code, and in turn release both batches for further processing.

Once the batches have either been confirmed to have a 1:1 correspondence in bar code numerals, or have been corrected or manually reviewed, approved, and released for further processing, the system then merges the corresponding batch records into a single batch record comprised of individual envelope and contents records, and then within each batch, further processes each combined envelope and contents record. Each such combined record may be formatted for data entry, e.g., entering an electronic address (such as an email address) for the intended recipient of the combined record. The combined records may also optionally be subjected to an optical character recognition ("OCR") process to convert all or a portion of the envelope and contents data to a format other than an image file. In any event, once the designated recipient for a combined envelope and contents record has been identified, that record may be dispatched electronically to the intended recipient, thus providing them the full informational content they were intended to receive, without incurring risk of potentially contaminated mail articles.

Preferably, for use in a production environment, a high speed scanner is utilized to scan the envelopes and contents. Suitable high speed scanning equipment may include, by way of example, a Kodak Imagelink 9500, which units are readily commercially available. Further, the computer software necessary to implement the method of the instant invention may be configured to run on a Windows platform, a UNIX platform, or any other operating system. Moreover, while the above description of a preferred embodiment of the invention particularly describes manual sorting of documents, label application, etc., it should be noted that automated mail handling apparatus may likewise be used. For example, U.S. Pat. No. 6,196,393 entitled "Extraction and Scanning System" (the specification of which is incorporated herein by reference) discloses an automated system for opening and scanning the contents of envelopes and storing such image in digital form in a file. Such apparatus may be suitable for automating the mail item opening and scanning processes described herein, so long as such apparatus is operated so as to scan both envelopes and their contents in separate batches.

In an alternative embodiment, a method for the high speed processing of an image containing document, such as a photograph, parchment, scroll, tablet or various other documents, is provided. The processing method achieves the conversion of the image containing document, i.e., photograph, into a digital image. This method provides an increase in the efficiency and speed of the conversion process which translates into increased production capabilities, with such increases being significant advantages over the prior art.

In a preferred embodiment, a method for processing a photograph is provided. The photographs have a picture side and a back side. The picture side contains the photographic image, and the back side is typically blank. The picture side and/or back side may contain various items, such as a date and time stamp, symbol or logo of the photo paper manufacturer, handwritten information, or printed information, and the like. In reference to the photograph and various other image containing documents which may be processed under the method of the present invention, it is understood that each side may contain images, words, or various other representations, on one or both sides of the image containing document. As such, with respect to other documents being processed using the method described herein, the sides of the documents or other image containing documents may be identified as a first or front side and second or back side.

Figure 4:
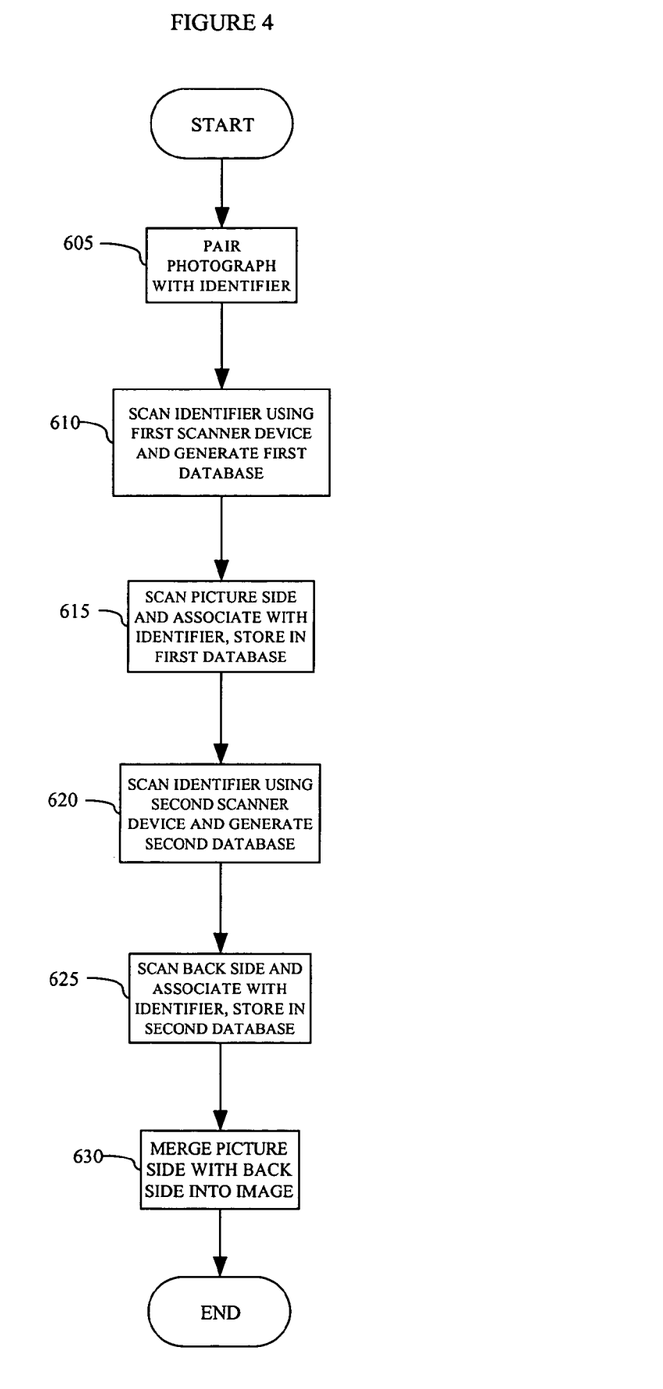
FIG. 4 is a schematic representation of an exemplary method for preparing and scanning photographic documents in accordance with an exemplary method of the present invention.

Referring now to FIG. 4 the method includes a first step 610 where a pairing of a photograph with an identifier occurs. In the current embodiment, the pairing is a physical pairing wherein the photograph is physically placed in connection with the identifier. It is contemplated that the pairing may occur through various means, such as through a visual pairing, electronic pairing, and the like, without departing from the scope and spirit of the present invention. The identifier provides a unique symbol to be associated with a particular photograph. In the current embodiment, the identifier is a barcode comprising a unique sequence of alphanumeric symbols. For example, the barcode may range from one to sixteen characters or numbers, taking exemplary forms such as 0000001, 0000002, 0000003 . . . NNNNNNN, wherein N may be any various numbers or characters. Thus, it is contemplated that various symbols, such as various characters and numbers may be created and implemented as an identifier for use in the method of the present invention. Further, the identifier may be created using alternative formats, such as an icon, ideogram, logo, and the like.

The utilization of the unique sequence of alphanumeric symbols is similar to the bar code labels which were used in the embodiments previously described above and in FIGS. 1-3. It is to be understood that multiple photographs may be processed by this method of the present invention using multiple unique identifiers, where each individual photograph is paired with one identifier. As identified above a first photograph may be paired with the identifier 0000001, a second photograph may be paired with 0000002, and so on. The identifiers are generally constructed in a manner which provides a rational order, such that the paired photograph is readily identified by the identifier. In a preferred embodiment, the identifiers are in a sequential order, such as that described above in reference to FIGS. 1-3. Alternatively, the identifiers may be rationally ordered along various syntactic orders, ideogrammatic orders, iconic orders, and the like.

The pairing of the identifier with the photograph is facilitated by the placement of the identifier upon an identifier medium which allows for the containment/storage, display and capture of the identifier. In the current embodiment, the barcode (identifier) is contained upon a barcode sheet (identifier medium). The barcode sheet is a piece of paper which contains a printed barcode upon it, the barcode being visually ascertainable and capable of being electronically captured. Thus, the pairing of the photograph with the identifier is the physical association of the barcode sheet including the identifier with the photograph. In the alternative, the identifier medium may be any media upon which an identifier may be contained/stored, displayed, and captured and with which the photograph may be paired. Thus, it is contemplated that the identifier medium may be various items, such as an electronic device (i.e., diskette, CD-ROM, DVD) in communication with a display device, various alternative paper forms (i.e., parchment, cardboard), other forms (i.e., tablet, scroll) and other materials (i.e., composites, synthetics), and the like It is contemplated that prior to the pairing of the photograph and the identifier upon the identifier medium, that the method may include a step for constructing the identifier upon the identifier medium. The constructing process may include a step of selecting the identifier to be used. Then a next step is selecting the identifier medium upon which the identifier is to be contained/stored and displayed. Part of the step for selecting the identifier medium may include a step for determining if the identifier medium is to present the identifier in a manner which allows the identifier to be electronically captured. With the identifier medium selected and the type of identifier selected, the next step is to place the identifier upon the medium. This may be accomplished by various printing, adhering, and/or connecting processes as contemplated by those of ordinary skill in the art. A plurality of identifiers may be placed upon an identifier medium arranged in various configurations without departing from the present invention, whereby the individual identifiers may be separated from one another for pairing purposes by various means. For example, if a plurality of identifiers were printed on a single sheet of paper, the individual identifiers may be separated by cutting the single sheet of paper about each unique identifier, such that multiple identifier mediums and identifiers may be created. Alternatively, a plurality of identifiers may be separately printed upon a plurality of labels contained upon one sheet. Then the labels, including the individual unique identifier printed upon it, may be removed from the single sheet and the label may be attached to an alternative identifier medium. It is contemplated that these various steps for creating an identifier upon an identifier medium may be executed by hand, through use of various mechanical devices, and/or through use of various electronic devices. In particular, a computing system including a printer may be used for creating the identifiers and placing them on the identifier medium.

Figure 5:
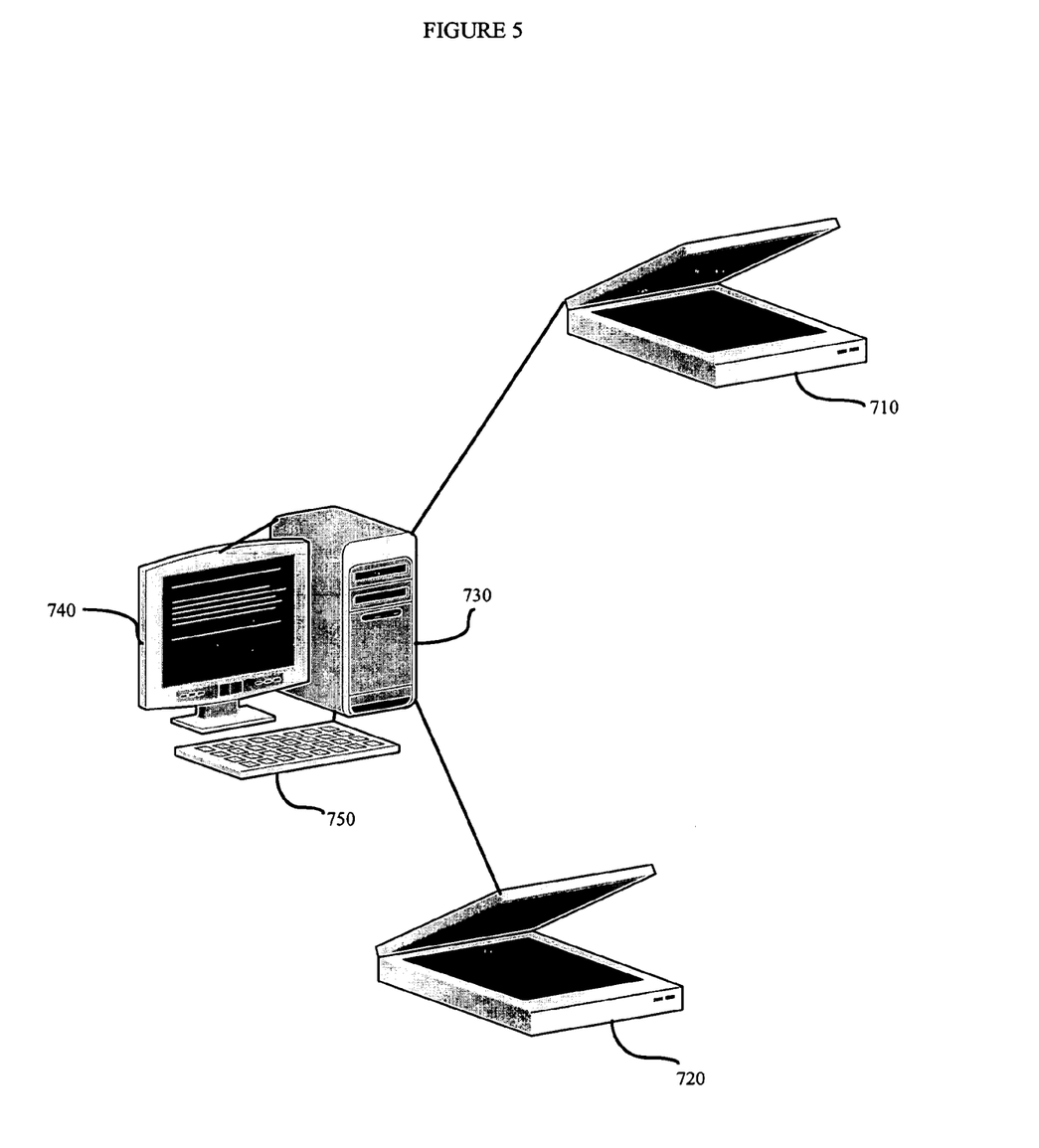
FIG. 5 is an illustration of a system upon which the exemplary methods of the present invention may be executed.

After the pairing of the photograph with the identifier in step 605, in step 610 the identifier is scanned a first time by a first scanner device and a first database is generated. In a preferred embodiment, the first scanner device is a color scanner. It is contemplated that the first scanner device may be a black and white scanner. The first scanner device is communicatively linked to a computing system (computer), as shown in FIG. 5, upon which a control logic (software program/control program) is being executed, which provides the executable instructions for the method of the present invention. One or more instruction of the control logic directs the creation of the first database into which a digital image of the identifier is placed upon its being scanned and communicated to the computing system. It is contemplated that the scanned digital image of the identifier may not be stored in the first database. For instance, the digital image of the identifier may be stored within a separate memory of the computer in a permanent manner. The storage of the digital image of the identifier may be temporary, such as within a buffer or other temporary storage capability of the computer. In the current embodiment, after the digital image of the identifier has been scanned into the first database, a picture side of the photograph is scanned by the first scanner device in step 615 creating a digital image of the picture side. The digital image of the picture side is communicated to the computing system whereby control logic, through executable instructions, directs the digital image of the picture side to be associated with the identifier and then stored in the first database. Now the first database of the computing system contains a digital image of the picture side of the photograph associated the digital image of the identifier.

It is contemplated that the order of scanning the identifier and picture side of the photograph and the creation of the first database may be varied. For instance, the scanning of the picture side may occur prior to the creation of the first database, in conjunction with the creation of the first database or after the creation of the first database. The first database may be created before the scanning, in conjunction with the scanning of or after the scanning of the identifier. The computing system creates the first database and stores the picture side of one or more photographs associated with a specific identifier. Thus, once the first database is created, a user may store multiple picture sides within it without having to create another first (picture side) database. The computing system may be a dedicated computing system in communication with the first scanner device or may be in communication with various devices. The various devices may include other scanner devices or other computing systems.

In step 620 a second scanner device is used to scan, for a second time, the same identifier as scanned the first time for the picture side of the photograph. The second scanner device is a black and white scanner, but may be various other types of scanners, including color, without departing from the scope and spirit of the present invention. The second scanner device is also in communication with the computing system (shown in FIG. 5) communicatively coupled with the first scanner device. Alternatively, the second scanner device may be communicatively coupled with a second computing system, as shown and described below in reference to FIG. 6. The second computing system may be further communicatively coupled with the first computing system or various other devices, such as other computing systems, scanner devices, and the like. In the current embodiment, the second scan of the identifier communicates a second digital image of the identifier to the computing system and the control logic directs the creation of a second database to be generated in the computing system into which the digital image of the identifier is placed/stored.

After the second database is generated and the digital image of the identifier is scanned into it, in step 625, a back side of the photograph is scanned by the second scanner device creating a digital image of the back side. The digital image of the back side of the photograph is communicated to the computing system from the second scanner device and associated with the digital image of the identifier in the second database. Thus, the digital image of the back side of the photograph in association with the digital image of the identifier is placed/stored in the second database of the computing system.

It is contemplated that the order of scanning the identifier and back side of the photograph and the creation of the second database may be varied. For instance, the scanning of the back side may occur prior to the creation of the second database, in conjunction with the creation of the first database or after the creation of the second database. The second database may be created before the scanning of, in conjunction with the scanning of or after the scanning of the identifier. The computing system creates the second database and stores the back side of one or more photographs that are each associated with a particular identifier. Alternatively, a second computing system communicatively coupled with the second scanner device may create the second database and store the back side of one or more photographs, that are each associated with a particular identifier. Thus, once the second database is created, a user may store multiple back sides within it without having to create another second (back side) database.

In an alternative embodiment, the method of the present invention employs another (third) scanner device, separate from the first and second scanner devices previously identified, for the purpose of scanning the identifier into the computing system. For example, the third scanner device may be a hand-held scanner device. In additional steps for the method of the present invention, the third scanner device is used to scan the identifier, transmitting it to a computing system with which the third scanner device is communicatively coupled, where a digital image is created. The third scanner may be communicatively coupled with one or more computing systems being employed in alternate embodiments of the present invention. The third scanner device may be employed to scan the identifier for association with the picture side and the back side of the photograph(s). The association of the identifier with both sides of the photograph(s) may occur in a similar manner as that described above, such that the identifier is scanned a first time and then associated with the scanned picture side and then the identifier is scanned a second time and then associated with the scanned back side.

In the current embodiment, the control logic directs the computing system to read the first and second databases for a digital image of an identifier. In step 630, the control logic for the computing system matches the digital image of the identifier read in the first database with the digital image of the same identifier read in the second database. Once matched the control logic directs the merging of the digital image of the picture side and the digital image of the back side into an image. The image is a single digital image of the photograph including the picture side and back side of the photograph. The digital photographic image, containing the picture side and back side of the photograph in a digital format, is then stored upon the computing system as an image file. The control logic may direct the computing system to store the image within either the first or second databases. Alternatively, the control logic may store the image file in various memory components of the computing system or direct the generation of a third database into which the photographic image may be stored.

In the alternate embodiment where two computing systems are being employed, the control logic of one or both of the computing systems may direct the matching of the identifier from the first database with the identical identifier in the second database. For example, the second computing system control logic may execute a read of the first database in the first computing system. After reading the first database, the control logic of the second computing system may execute a comparison of the first database with the second database identifying and matching identical identifiers from each database. The control logic of the second computing system may then merge the associated picture and back sides into one or more single digital photographic images creating an image file for each associated picture and back side with identical identifiers. The image file(s) may be stored within a memory of the second computing system or another database may be created and the image file(s) stored within.

In an additional step of the method of the present invention, the computing system(s) may transmit the photographic image to an intended recipient. The intended recipient is in communication with the computing system(s) and is preferably another computing system. However, various other electronic devices may be communicatively coupled with the computing system(s) and have the photographic image transmitted to them by the computing system.

Prior to the scanning by the second scanner device of the identifier, the method of the present invention may include the step of verifying that the scanned picture side corresponds to the back side of the photograph to be scanned by the second scanner device. In a preferred embodiment, the verification occurs through a visual display. The visual display may be provided by a display device (i.e., computer monitor) communicatively coupled with the computing system. In operation with the method of the present invention, an operator of the second scanner may receive the photograph and identifier to scan the back side. Before beginning the scanning process, the operator may have the computing system display the digital image of the picture side of the photograph associated with the same identifier stored in the first database. The computing system displays the digital image of the picture side from the first database upon a monitor which is visually ascertainable by the operator. The operator by viewing the displayed digital image may manually view the picture side of the photograph they received and compare it against the displayed digital image. This may assist in increasing the accuracy of ensuring that matching scanned picture side and back side images into the first and second databases have the same identifier associated with them.

It is contemplated that various verification techniques may be employed, such as various visual displays, audible displays and/or electronic means. For instance, the computer may include a speaker through which information about the digital image of the picture side may be communicated. Alternatively, the computer may provide various indicators, such as blinking lights, words on the monitor, and the like to convey information about the digital image of the picture side.

Prior to merging the picture side with the matching back side of the photograph based on the identifier, the method of the present invention may include the step of comparing the first database and the second database to identify any discrepancies. For instance, the reading of the first database may reveal a certain number of identifiers and the composition (individual symbols) of each identifier. When the second database is read the number and composition of identifiers stored within is then checked against that of the first database. From this it may be determined that the first and second databases contain the same information and no discrepancies exist. It may be determined that the first database contains information not found in the second database or vice versa. Then an identification of what is and is not in the second database as compared to the first database may be made. With such information, the computing system may alert the operator of the discrepancies found and allow for the correction of such discrepancies.

It is to be understood that the method of the present invention may be applied to one or a plurality of image containing documents (i.e., photographs, scrolls, tablets, and the like). The recited method steps above may be applied to each photograph. Each photograph is paired with a unique identifier, the identifier and picture side of the photograph are scanned and their digital images are associated and stored within the first database. Thus, the first database may contain/store a plurality of digital images of picture sides associated with identifiers. Likewise, the second database may contain/store a plurality of digital images of the back sides associated with their identifiers.

It is further contemplated by the present invention that the executable method of the present invention may command/direct the formation of three or more databases within the computing system or multiple computing systems. Thus, parallel processing of distinct groups of photographs may be accomplished using the method of the present invention. Groups of photographs are identified as batches of photographs by the present invention. Prior to pairing the photograph with the identifier in step 605, the method of the present invention contemplates receiving a plurality of photographs which may be individually processed. Further, the present invention contemplates that the plurality of photographs received may be separated into one or more batches of photographs by grouping the photographs together based on various criteria, such as topic, date, location, composition, size, and the like.

The individual batches of photographs are made up of the grouping of two or more photographs. Each grouped batch may be paired with a batch identifier, which in a preferred embodiment is a barcode consisting of various symbols contained upon a batch medium. It is contemplated that various other symbols may be employed as contemplated by those of ordinary skill in the art. In operation, a grouped batch of thirty photographs may have a single batch identifier associated with all of them. This association may occur by first scanning the batch identifier prior to or after the scanning of the individual photographs and their associated identifiers. The batch identifier provides a unique identity for the grouping of the photographs as desired by a user. Second a digital image of the batch identifier is communicated to the computing system or multiple computing systems. The computing system(s) is able to store/contain the digital image of the batch identifier in batch database. The digital image of the batch identifier may be stored/contained within the computing system(s) in various ways, such as a file within a separate batch database, a file associated with the first database or a file associated with the second database. It is to be understood that the association of the batch identifier with either the first or second database allows for the categorization of either the first or second database as the batch database. Further, if both the first and second databases are associated with the batch identifier then they are categorized as the first batch database and second batch database, respectively. It is further contemplated that the batch identifier may be stored/contained within the computing system(s) in a temporary or permanent manner.

If the batch identifier is stored independently, then in operation as each side of a photograph has a scanned digital image communicated to the computing system(s), the control logic of the computing system(s) may operate to associate the batch identifier with that individual digital image before it is stored within either the first or second database. In the alternative, if the batch identifier is initially associated with the first and/or second database, then as the scanned digital image is processed for storage within either database the batch identifier may be associated with the digital image. It is contemplated that a method of the present invention may include the step of identifying and categorizing the photographs based on the batch identifier associated with the photograph. This step may occur immediately prior to, during or after the merging of the picture side and back side of a photograph which have been associated with the batch identifier. During the verification process described previously, the batch identifier may also be compared against the digital images of the picture and back sides to ensure accuracy in the method of the present invention.

It is further contemplated that the digital images of the picture side and back side of a photograph may be associated with more than one batch identifier. For example, a first batch identifier may be associated with the picture and back sides of a first photograph and include a barcode for indicating the photograph belongs to a grouping of photographs categorized by their time stamp. A second batch identifier may also be associated with the picture and back sides of the first photograph and include a barcode for indicating the photograph belongs to a grouping of photographs categorized by the location where the photograph was taken. Such a dual grouping or batching identity may be given to multiple photographs which are scanned and imaged according to the method of the present invention.

An exemplary system for performing the method of the present invention is shown in FIG. 5. The system includes a first scanner device 710 and a second scanner device 720 both of which are communicatively coupled with a computing system 730 including a display device 740 and a keyboard 750. The computing system 730 includes a control program operative on a microprocessor in electrical communication with the first and second scanner devices and the display device 740 and keyboard 750. In a preferred embodiment, the first scanner 710 is a color scanner suitable for scanning a picture side of a color photograph and the second scanner 720 is a black and white scanner suitable for scanning the back side of a color photograph. It is contemplated that both scanner devices may be color and/or black and white scanners and that the document being scanned may vary, such as a scroll or other image containing document. Further, the second scanner device 720 is capable of scanning and creating a digital image of information contained on the back side of a photograph or a second side of a document. The system allows one or more operators to execute the method of processing image containing documents of the present invention.

In a preferred embodiment, the system is operated by two users of the two scanner devices. Thus, the system employs the scanner devices in a serial manner. One user operates the first scanner device 710 and a second user operates the second scanner device 720 and the computing system 730. The first user scans in the identifier and picture side of the photograph. This information is communicated to the computing system where the control program associates the identifier and picture side within a first database. For verification purposes the second operator may have visually displayed upon the display device 740, the digital image of the picture side. Thus, when the second operator has the photograph and paired identifier, they may visually verify that the back side they are about to scan in and associate with the identifier into the second database is the correct back side for the digital image of the picture side. Once the verification is complete, the second user scans in the identifier for a second time and then scans in the back side. This information is transmitted to the computing system 730 where the control program associates the identifier and back side within the second database.

The computing system then matches the identifier from the digital image of the picture side in the first database and the digital image of the back side in the second database. Once the match is determined to be correct the computing system merges the two digital images into a photographic digital image. The computing system may then display the photographic digital image on the display device 740 and/or transmit the photographic digital image containing the picture side and back side of the photograph to an intended recipient.

The system may further include another (third) scanner device, which may be used for scanning the identifier and if present a batch identifier. The third scanner device is communicatively coupled with the computing system 730 in order to provide the scanned digital images to the computing system 730. The third scanner device may be similar in all respects to either the first or second scanner devices. Alternatively, the third scanner device may be a handheld scanner particularly suited for scanning a barcode identifier.

A batch of photographs may be processed in a manner similar to that described above. A batch identifier may be scanned by one of the scanner devices and transmitted to the computing system 730. The control program of the computing system may associate the batch identifier with either the original first and/or second database or create a new database, thereby creating a batch database. The control program also allows for the batch identifier to be associated with the individual sides of the photographs which are scanned into the computing system 730. The association of the batch identifier may occur prior to the scanned picture side and/or back side reaching either the first or second database, respectively. In the alternative, the association of the batch identifier may occur in conjunction with the communication of the scanned picture or back side into the first or second database, respectively, or may occur within the first or second database, after the scanned image of the picture side or back side has been communicated to the first or second database, respectively.

Figure 6:
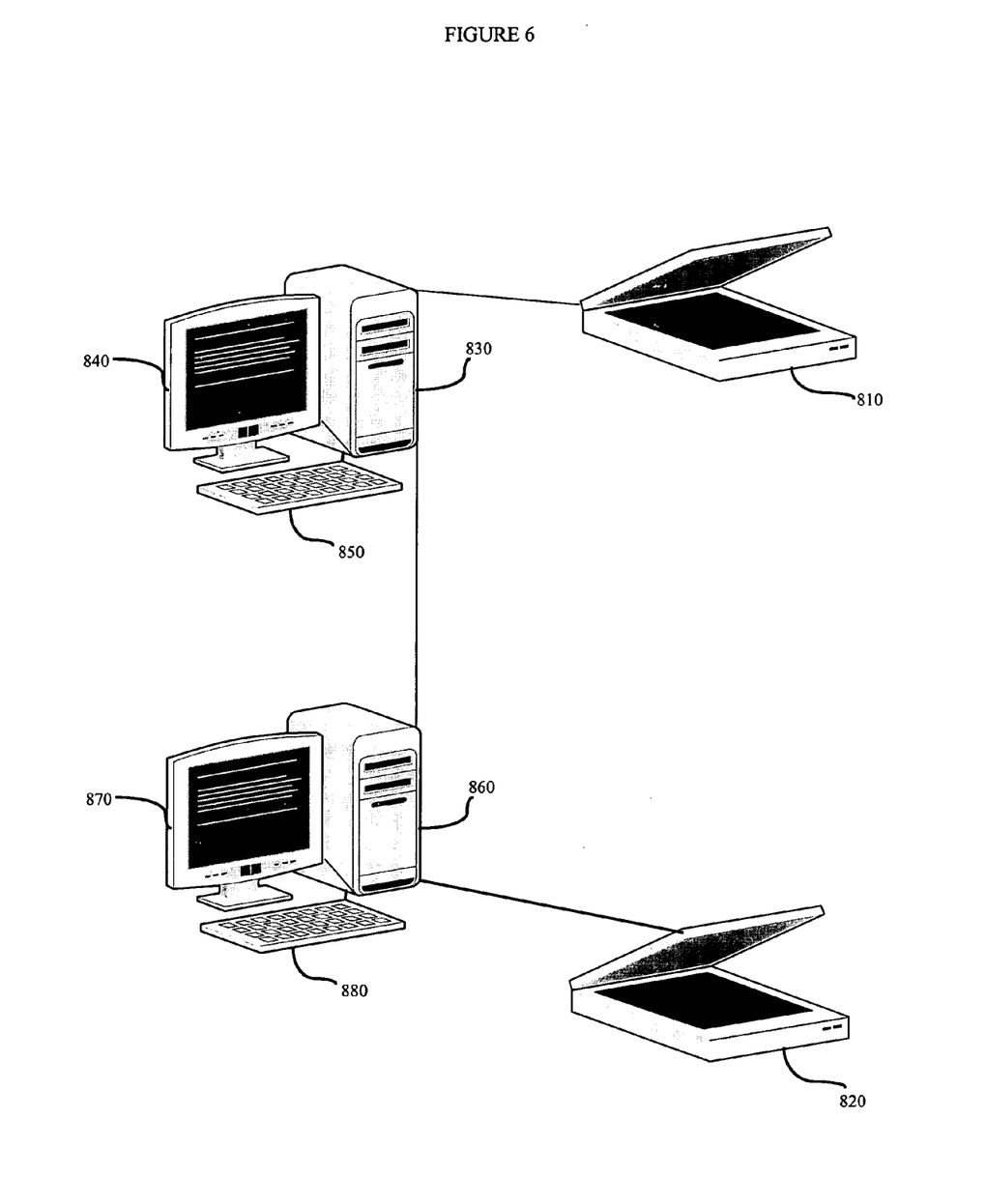
FIG. 6 is an illustration of a second exemplary system upon which the methods of the present invention may be executed.

In an alternative embodiment shown in FIG. 6, a system of the present invention may employ a first scanner device 810 communicatively coupled with a first computing system 830 and a second scanner device 820 communicatively coupled with a second computing system 860. The first scanner device 810 and first computing system 830, which includes a first display device 840 and user input device 850 communicatively coupled with the microprocessor of the computing system 830, may generate a first database and store digital images of picture sides of photographs associated with identifiers. The second scanner device 820 and second computing system 860, which includes a second display device 870 and second user input device 880 communicatively coupled with the microprocessor of the second computing system 860, may generate a second database and store digital images of back sides of the photographs associated with identifiers. The first computing system 830 may be communicatively coupled with the second computing system 860. This may allow for the digital images of the picture sides of photographs to be transmitted to the second computing system 860. The control logic of the second computing system 860 may then be able to match the picture sides from the first database with the back sides from the second database and merge the proper sides together to form a digital image of the photograph.

It is further contemplated that the second computing system 860, in communication with the first computing system 830, may be able to display the image of the picture side of photographs on the second display device 870 (i.e., computer monitor). This may allow the user of the second scanner device 820 and second computing system 860 to visually verify the association of a back side with the proper picture side of a photograph. In the alternative, the first computing system 830, communicatively coupled with the first display device 840, may display the image of the picture side of the photograph.

Either the first computing system 830 or second computing system 860 may include the control logic for matching and merging the picture side with the proper back side of a photograph. Thus, the digital images of the picture side and back side of a photograph may be transmitted to and from either the first or second computing system. It is further contemplated that either the first or second computing system may transmit the digital image of the photograph to another device capable of receiving such an electronic transmission.

In a still further embodiment, a first computing system and a second computing system, communicatively coupled with a first scanner device and a second scanner device, respectively, may be further communicatively coupled with a third computing system. The third computing system may be utilized for providing visual, audible, electronic displays and/or for the matching and merging of the picture and back sides of a photograph. Further, the third computing system may be capable of transmitting the digital image of the photograph to another device capable of receiving such an electronic transmission. It is to be understood that the number of computing systems, scanner devices, identifiers, and the like employed by the present invention may vary without departing from the scope and spirit of the present invention.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A method for processing a photograph, comprising the steps of:
   pairing the photograph with an identifier;
   scanning the identifier a first time using a first scanner device and generating a first database;
   scanning a picture side of the photograph using the first scanner device to capture an image of the picture side and associating the identifier with the image of the picture side for storage within the first database;
   scanning the identifier a second time using a second scanner device and generating a second database;

scanning a back side of the photograph using the second scanner device to capture an image of the back side and associating the identifier with the image of the back side for storage within the second database;

merging the image of the picture side from the first database and the image of the back side from the second database by matching the identifier associated with the picture side and back side, creating a single image containing the image of the picture side and the image of the back side of the photograph.

2. The method of claim 1, wherein the identifier is a sequence of alphanumeric symbols.

3. The method of claim 2, wherein the alphanumeric symbols are constructed as a barcode.

4. The method of claim 1, wherein the identifier is contained on an identifier media.

5. The method of claim 4, further comprising the step of constructing an identifier on the identifier media prior to pairing the photograph with the identifier.

6. The method of claim 4, wherein the identifier media is selected from the group consisting of barcode sheet, paper, tablet, parchment, diskette, CD-ROM, or DVD.

7. The method of claim 1, wherein the first database contains a plurality of images of picture sides, each one associated with a unique identifier, from a plurality of photographs and the second database contains a plurality of images of back sides each one associated with the unique identifier which matches the image of the back side to the image of the picture side from the plurality of photographs.

8. The method of claim 1, further comprising the step of verifying the scanned picture side corresponds to a back side of the photograph to be scanned prior to scanning the identifier a second time.

9. The method of claim 8, wherein verification occurs by a visual display of the scanned picture side of the photograph, audible display or electronic means.

10. The method of claim 1, further comprising the step of comparing the first database and second database to identify discrepancies prior to merging the image of the picture side with the matching image of the back side based on the identifier.

11. The method of claim 1, further comprising the steps of receiving a plurality of photographs, grouping the photographs into one or more batches of photographs and pairing a batch identifier from a batch media with each of the one or more batches of photographs prior to pairing a photo with an identifier.

12. The method of claim 11, further comprising the step of scanning the batch identifier and generating a batch database.

13. The method of claim 11, further comprising the step of grouping batches of photographs based on at least one of topic, date, location, composition and size.

14. The method of claim 1, further comprising the step of transmitting to an intended recipient the single image of the picture and back side of the photograph.

15. The method of claim 1, further comprising the step of scanning the identifier with a third scanner device.

16. The method of claim 1, wherein the first and second scanner are communicatively coupled with a computing system.

17. The method of claim 1, wherein the first scanner device is communicatively coupled with a first computing system and the second scanner device is communicatively coupled with a second computing system, the second computing system further communicatively coupled with the first computing system.

18. A system for processing a photograph, comprising:
a first scanner device for scanning an identifier and a picture side of the photograph to capture an image of the picture side;
a second scanner device for scanning the identifier and a back side of the photograph to capture an image of the back side; and
a control program operative on a microprocessor in electrical communication with the first and second scanner devices, said control program being operative to pair the scanned image of the picture side of the photograph with the scanned identifier into a first database and pair the scanned image of the back side of the photograph with the scanned identifier into a second database, the control program being further operative to:
merge the image of the picture side from the first database and the image of the back side from the second database to create a single image by matching the identifier associated with the image of the picture and the image of the back side, the single image containing the image of the picture side and image of the back side of the photograph.

19. The system for processing a photograph of claim 18, wherein the control program is operative to verify that the scanned picture side corresponds to the back side of the photograph to be scanned, prior to scanning the identifier a second time.

20. The system for processing a photograph of claim 18, wherein the control program is operative to compare the first database and second database to identify discrepancies prior to merging the image of the picture sides within the first database together with the matching image of the back sides within second database.

21. The system for processing a photograph of claim 18, wherein the control program is operative to receive a plurality of photographs, group the photographs into one or more batches of photographs and pair a batch identifier from a batch media with each of the one or more batches of photographs prior to pairing a photo with an identifier.

22. The system for processing a photograph of claim 21, wherein each of the plurality of photographs within a batch is paired with an identifier media including the identifier, the individual identifiers arranged in a sequential manner.

23. The system for processing a photograph of claim 18, wherein the control program is operative to generate a batch database.

24. The system for processing a photograph of claim 18, wherein the first scanner device is a color scanner and the second scanner device is a black and white scanner.

25. The system for processing a photograph of claim 18, wherein the control program is operative to transmit to an intended recipient the single image of the picture and back side.

26. The system for processing a photograph of claim 18, further comprising a third scanner device for scanning the identifier, the third scanner device is at least one of a handheld device and table top device.

27. The system for processing a photograph of claim 18, further comprising at least two computing systems including microprocessors communicatively coupled with one another and the scanner devices.

28. The system for processing a photograph of claim 18, further comprising at least three computing systems including microprocessors communicatively coupled with one another and the scanner devices.

* * * * *